(12) United States Patent
Lin et al.

(10) Patent No.: US 12,086,638 B2
(45) Date of Patent: Sep. 10, 2024

(54) TOPOLOGY OF ACCELERATORS

(71) Applicant: MONTAGE TECHNOLOGY CO., LTD., Shanghai (CN)

(72) Inventors: Yishan Lin, Shanghai (CN); Guoheng Wei, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/964,256

(22) Filed: Oct. 12, 2022

(65) Prior Publication Data
US 2023/0111351 A1    Apr. 13, 2023

(30) Foreign Application Priority Data
Oct. 12, 2021   (CN) .......................... 202111186980.5

(51) Int. Cl.
*G06F 9/50*   (2006.01)
*G06F 9/52*   (2006.01)
*G06F 9/54*   (2006.01)

(52) U.S. Cl.
CPC .............. *G06F 9/5027* (2013.01); *G06F 9/52* (2013.01); *G06F 9/544* (2013.01)

(58) Field of Classification Search
CPC ........... G06F 9/5027; G06F 9/52; G06F 9/544
See application file for complete search history.

(56) References Cited

U.S. PATENT DOCUMENTS

| 5,276,892 A | * | 1/1994 | Olesin ..................... G06F 9/226 |
| | | | 712/245 |
| 10,394,747 B1 | | 8/2019 | Paneah et al. |
| 2022/0035762 A1 | * | 2/2022 | Zhang ................. G06F 13/4068 |
| 2022/0067536 A1 | * | 3/2022 | Datla ..................... G06N 3/063 |

FOREIGN PATENT DOCUMENTS

CN    103744818 A    4/2014

* cited by examiner

*Primary Examiner* — Michael J Metzger
(74) *Attorney, Agent, or Firm* — Oliff PLC

(57) ABSTRACT

A topology of accelerators is provided, including a plurality of accelerators and a broadcast buffer. Each of the plurality of accelerators corresponds to a first memory and obtain input data from an external second memory respectively, wherein the accelerator can only directly access its corresponding first memory, and the broadcast buffer is coupled between one of the plurality of accelerators and the corresponding first memory. When receiving a write command and the input data from the accelerator to which it is coupled, the broadcast buffer is configured to write the input data into the corresponding first memory according to the write command, and when broadcast is enabled, the broadcast buffer is configured to broadcast the write command and the weight data in the input data. This application can improve the access performance of the accelerators and reduce the access delay.

9 Claims, 4 Drawing Sheets

TOPOLOGY OF ACCELERATORS

REFERENCE TO RELATED APPLICATION

This application claims the benefit of priority to Chinese Application number CN2021111869805, filed with CNIPA on Oct. 12, 2021, the contents of which are incorporated herein by reference in its entirety.

TECHNICAL FIELD

The present disclose relates to the field of integrated circuits, and more particularly to a topology of accelerators.

BACKGROUND

Artificial Intelligence core (AI core) is a hardware accelerator that can accelerate deep learning inference algorithms. The accelerator can be configured and scheduled by an external CPU to complete operations of operator in each layer in the convolutional neural network, for example, convolution layer, deconvolution layer, fully-connected layer, activation layer, pooling layer, local response normalization, and so on.

The input data of AI core includes feature data and weight data, and output data is calculated and generated by the AI core. In order to improve access performance, a static random access memory (SRAM) with large storage space (for example, 2M to 4M bytes) is usually provided outside the AI core. The data stored in the SRAM comprises input data of the first layer (including feature data and weight data, etc.), and data generated by the calculation from the first layer to the last layer. The input data of the first layer needs to be transferred from an external memory outside the AI core (such as the DDR-RAM), and the data generated by the calculation of the last layer needs to be transferred from the SRAM to the external memory.

There are a plurality of AI cores in a chip to support scenario applications with different performance, power consumption and cost. There are different topology options for multiple AI core extensions. Common topologies include Mesh grid structure and Crossbar fully interconnected structure.

However, the Crossbar fully interconnection structure or the Mesh grid structure has the following defects:

(1) When multiple (for example, n) AI cores access data in the same address range in the SRAM in parallel, only one AI core is arbitrated to the SRAM interface, resulting in bandwidth reduction to 1/n since multiple access requests need to be arbitrated;

(2) When the Crossbar structure or the Mesh structure has large bus bandwidth (such as, 1024 bit), it is easy to cause back-end timing and wiring congestion problems;

(3) Due to the limitations of performance and back-end implementation, the extensibility of core quantity of is poor;

(4) The synchronous running time of multiple AI cores is unbalanced, which is not conducive to the performance and power consumption of the entire AI system.

Therefore, there is a need to propose a topology of accelerators that can improve extensibility and access performance.

SUMMARY OF THE INVENTION

An object of the present application is to provide a topology of hardware accelerators to improve access performance of the accelerators and reduce access delay.

An embodiment of this application discloses a topology of hardware accelerators, the topology may comprise:

a plurality of accelerators, each of the plurality of accelerators corresponding to a first memory and obtaining input data from an external second memory, wherein each accelerator can only directly access its corresponding first memory; and a broadcast buffer, coupled between one of the plurality of accelerators and its corresponding first memory, wherein when receiving a write command and input data from the accelerator to which it is coupled, the broadcast buffer is configured to write the input data into the corresponding first memory according to the write command, and to broadcast the write command and weight data in the input data when broadcast is enabled.

In some embodiments, the topology may further comprise:

at least one broadcast arbiter, respectively coupled between each of the other accelerators in the plurality of accelerators and its corresponding first memory, wherein the broadcast buffer is configured to write the input data to the corresponding first memory when receiving a write command and input data from the accelerator to which it is coupled, and to receive a broadcast write command and weight data when broadcast reception is enabled, and when simultaneously receiving the write command and input data from the accelerator and the broadcast write command and weight data, the broadcast arbiter is further configured to arbitrate priorities of the write command and input data from the accelerator and the broadcast write command and weight data, and perform write operation according to arbitration result.

In some embodiments, the priority of the broadcast write command and weight data is higher than the priority of the write command and input data from the accelerator.

In some embodiments, the broadcast buffer may further comprise:

a command buffer, configured to receive the write command from the accelerator to which it is coupled when the broadcast is enabled, and to broadcast the write command to indicate to write the broadcast weight data to the same offset address of the other first memories; and a data buffer, configured to receive the weight data from the accelerator to which it is coupled and to broadcast the weight data when the broadcast is enabled.

In some embodiments, the broadcast buffer may further comprise:

a first identifier, configured to obtain identification information from the write command received from the accelerator, determine whether the identification information is target identification information, and notify the data buffer to receive the weight data when it is determined that the identification information is the target identification information.

In some embodiments, the broadcast buffer may further comprise:

a synchronizer, configured to receive and synchronize a write completion response signal from the broadcast arbiter and output the synchronized write completion response signal; and a reply arbiter, configured to receive a write completion response signal from the first memory corresponding to the broadcast buffer and the synchronized write completion response signal from the synchronizer, and arbitrate priorities of the received write completion response signals, and output the write completion response signal according to arbitration result.

In some embodiments, the broadcast arbiter may comprise:

a write command selector, configured to receive a write command from the accelerator to which it is coupled, output the write command to the corresponding first memory, and also receive broadcast write commands when broadcast reception is enabled, and when simultaneously receiving the write command from the accelerator and the broadcast write command, arbitrate priorities of the broadcast write command and the write command from the accelerator, and output according to arbitration result; and a write data selector, configured to receive the input data from the accelerator to which it is coupled, write the input data into the corresponding first memory, and also receive the broadcast weight data when the broadcast reception is enabled, and when simultaneously receiving the broadcast weight data and the input data from the accelerator, arbitrate priorities of the broadcast weight data and the input data from the accelerator, and output according to arbitration result.

In some embodiments, the broadcast arbiter may further comprise:

a second identifier, configured to obtain identification information from the write command received from the accelerator, determine whether a write operation of the input data corresponding to the write command from the accelerator is completed according to the identification information, and notify the write data selector to write the broadcast weight data into the corresponding first memories when it is determined that the write operation is completed.

In some embodiments, the broadcast arbiter may further comprise:

a reply selector, configured to receive write completion response signals from the corresponding first memories, and selectively send the write completion response signals to the broadcast buffer or the accelerator to which it is coupled according to data source corresponding to the write completion response signal.

In some embodiments, the accelerator may comprise a direct memory access, wherein the direct memory accessor is configured to obtain input data from the external second memory and write the input data to the corresponding first memory through the broadcast buffer.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application more clear, embodiments of the present application will be further described in detail below with reference to the accompanying drawings.

An embodiment of the present application discloses a topology of accelerators. The topology is a point-to-point structure, which includes a plurality of accelerators, each accelerator (e.g. AI core) corresponds to a first memory (e.g. SRAM), and each accelerator can only directly access its corresponding first memory. Therefore, there is no situation that the plurality of accelerators access the same address range data of the SRAM in parallel, which can improve the access bandwidth of the accelerators.

Figure 1:
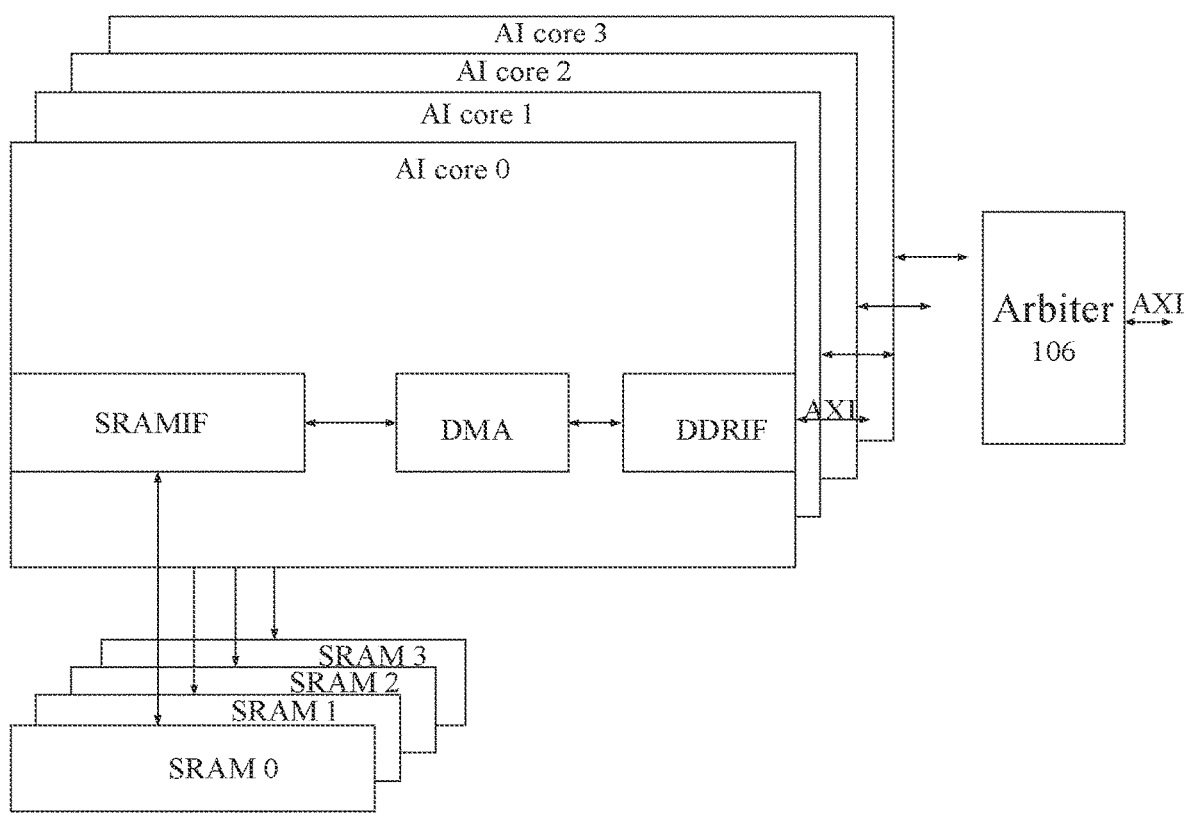
FIG. 1 is a schematic diagram of a plurality of accelerators adopting a point-to-point topology according to an embodiment of the present application.

FIG. 1 shows a schematic diagram of four accelerators adopting a point-to-point topology according to an embodiment of the present application, but the application is not limited thereto, and under the condition that the DDR bandwidth, power consumption, and area of chip are satisfied, the number of accelerators is not limited, for example, the number of accelerators can be extended to 8, 16, 32, etc. As shown in FIG. 1, the topology includes four accelerators AI core 0-AI core 3, each accelerator corresponds to a first memory (that is, AI core 0-AI core 3 respectively correspond to first memories SRAM 0-SRAM 3), and each accelerator can only access its corresponding first memory, and the four accelerators access an external second memory DDR (not shown in the figure) through an arbiter. Each accelerator includes a direct memory access (DMA), a first interface SRAMIF, and a second interface DDRIF. The DMA accesses the corresponding SRAM through the first interface and accesses the external second memory DDR (hereafter also referred to as "the external DDR") through the second interface DDRIF. The DMA can transfer the input data (including feature data, weight data, etc.) from the external DDR to the corresponding SRAM, and transfer the output data from the corresponding SRAM to the external DDR, wherein the output data is calculated from the input data.

In one embodiment, there are two modes of calculation performed by the accelerators: batch mode and non-batch mode. The scenario corresponding to the batch mode is that the weight data is reused by the feature data input by multiple accelerators, that is, the feature data input by multiple (at least two) accelerators corresponds to the same weight data. The scenario corresponding to the non-batch mode is that the weight data is not reused by the feature data of multiple accelerators, that is, the feature data of each accelerator corresponds to different weight data.

Obviously, in the non-batch mode, the DMA inside each accelerator only needs to transfer the input data and the output data between the external DDR and the corresponding SRAM. In the batch mode, since multiple accelerators need to input the same weight data, the weight data can be obtained by one of the multiple accelerators from the external DDR, and in the process of writing the weight data into the corresponding first memory SRAM, the weight data can be broadcasted for other accelerators in need to acquire the weight data.

Specifically, the topology of the accelerators further includes a broadcast buffer. The broadcast buffer is coupled between one of the plurality of accelerators and its corresponding first memory, when receiving a write command and input data from the accelerator to which it is coupled, the broadcast buffer is configured to write the input data into its corresponding first memory according to the write command, and to broadcast the write command and weight data in the input data when broadcast is enabled.

In one embodiment, the topology of the accelerators may further include at least one broadcast arbiter. The at least one broadcast arbiter is respectively coupled between each of the other accelerators in the plurality of accelerators and its corresponding first memory, wherein the other accelerators are accelerators other than the one coupled to the broadcast buffer. The broadcast arbiter is configured to write the input data into the corresponding first memory when receiving the write command and input data from the accelerator to which it is coupled, and to receive the broadcast write command and weight data when the broadcast is enabled. When simultaneously receiving the write command and input data from the accelerator and the broadcast write command and weight data, the broadcast arbiter arbitrates priorities of the write command and input data from the accelerator and the broadcast write command and weight data, and performs write operation according to arbitration result. In one embodiment, the priority of the broadcast write command and weight data may be set higher than the priority of the write command and input data from the accelerator. In this way, when the broadcast arbiter simultaneously receives the write command and input data from the accelerator and the broadcast write command and weight data, it preferentially writes the weight data to the first memories according to the broadcast write command, and secondly writes the input data to the first memory according to the write command from the accelerator.

Figure 2:
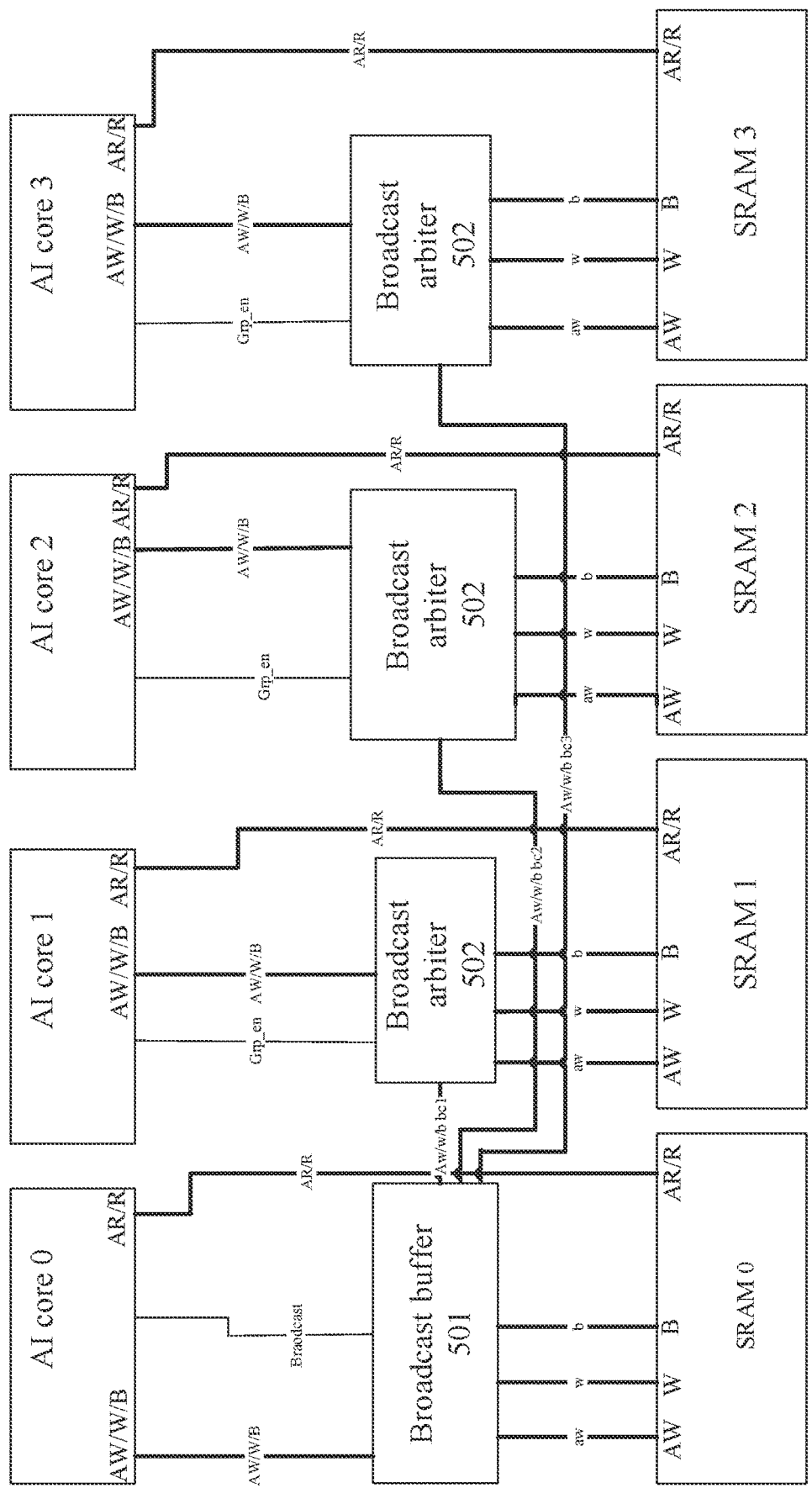
FIG. 2 is a hardware block diagram of accelerator broadcast mechanism according to an embodiment of the present application.

As shown in FIG. 2, taking the accelerator coupled to the broadcast buffer as the accelerator AI core 0, the broadcast buffer 501 is coupled between the accelerator AI core 0 and its corresponding SRAM 0, and the accelerator AI core 0 realizes the write operation with the first memory SRAM 0 through the broadcast buffer 501. There is a write channel (AW/W/B) between the accelerator AI core 0 and the broadcast buffer 501, there are a write command channel (AW), a write data channel (W), and a write back channel (B) between the broadcast buffer 501 and SRAM 0, and there is also a read channel (AR/R) between the accelerator AI core 0 and the first memory SRAM 0. Each broadcast arbiter 502 is respectively coupled between AI core 1-AI core 3 and the corresponding SRAM 1-SRAM 3. Taking AI core 1 as an example, the accelerator AI core 1 realizes write operation with the SRAM 1 through the broadcast arbiter 502. There is a write channel (AW/W/B) between the accelerator AI core 1 and the broadcast arbiter 502, there are a write command channel (AW), a write data channel (W), and a write back channel (B) between the broadcast arbiter 502 and the SRAM 1, and there is a read channel (AR/R) between the accelerator AI core 1 and the SRAM 1. There are broadcast write channels (AW/W/B bc1-AW/W/B bc3) between the broadcast buffer 501 and each broadcast arbiter 502.

In one embodiment, the broadcast function of the broadcast buffer 501 is controlled by a broadcast enable signal Broadcast. For example, when the broadcast enable signal Broadcast is at a high level, the broadcast function is enabled, and the broadcast buffer can broadcast out at this time; when the broadcast enable signal Broadcast is at a low level, the broadcast function is disabled, and the broadcast buffer cannot broadcast out at this time, and vice versa.

In one embodiment, the broadcast reception function of the broadcast arbiter 502 is controlled by an arbitration enable signal Grp_en. For example, when the arbitration enable signal Grp_en is at a high level, the broadcast reception function of the broadcast arbiter 502 is enabled and it receives broadcast signals from the broadcast buffer 501, and when the arbitration enable signal Grp_en is at a low level, the broadcast reception function of the broadcast arbiter 502 is disabled and it cannot receive broadcast signals from the broadcast buffer 501, and vice versa.

As shown in FIG. 2, the accelerators AI core 0-AI core 3 respectively corresponds to the first memory SRAM 0-first memory SRAM 3. Each SRAM can only be accessed separately by the corresponding accelerator AI core, so there is no performance bandwidth loss during the read process. When receiving a write command and input data from the accelerator AI core 0, the broadcast buffer 501 writes the input data into the corresponding first memory SRAM 0 according to the write command, and broadcasts the write command and weight data in input data when the broadcast function is enabled (for example, the Broadcast is high level). When receiving a write command and input data from the coupled accelerator, each broadcast arbiter 502 writes the input data into the corresponding first memory according to the write command, and receives the write command and weight data broadcast by the broadcast buffer 501 when the broadcast reception function is enabled. And when receiving the write command and input data from the accelerator and the broadcast write command and weight data at the same time, the broadcast arbiter 502 arbitrates the priorities of the write command and input data from the accelerator and the broadcast write command and weight data, and performs the write operation according to the arbitration result.

It should be noted that the convolutional neural network includes multiple layers, wherein input data (including feature data, weight data, and the like) of the first layer is transferred by the accelerator AI core from the external second memory DDR to the corresponding first memory SRAM, and input data of the next layer is output data of its previous layer. Therefore, based on the application scenario analysis, the broadcast mechanism may only be triggered in the case that the weight data input by the first layer needs to be transferred from the external second memory DDR to the corresponding first memory SRAM by the accelerator AI core 0 and the weight data can be used by multiple accelerators at the same time. At this time, the accelerators AI core 1-AI core 3 may not perform write operations on the first memories SRAM 1-SRAM 3, and the broadcast arbiters may not receive the write requests from the accelerators AI core 1-AI core 3, so the write operation has no performance bandwidth loss. SRAM 0 only receives write requests from the accelerator AI core 0, so the write operations of the accelerator AI core 0 also has no performance bandwidth loss. In one embodiment, the accelerators AI core 1-AI core 3 may not perform a write operation on the first memories SRAM 1-SRAM 3 through hardware synchronization logic or through CPU control during the broadcast process of the broadcast buffer 501. It can be seen that the arbitration function of the broadcast arbiter is not necessary for the embodiments of this application.

Figure 3:
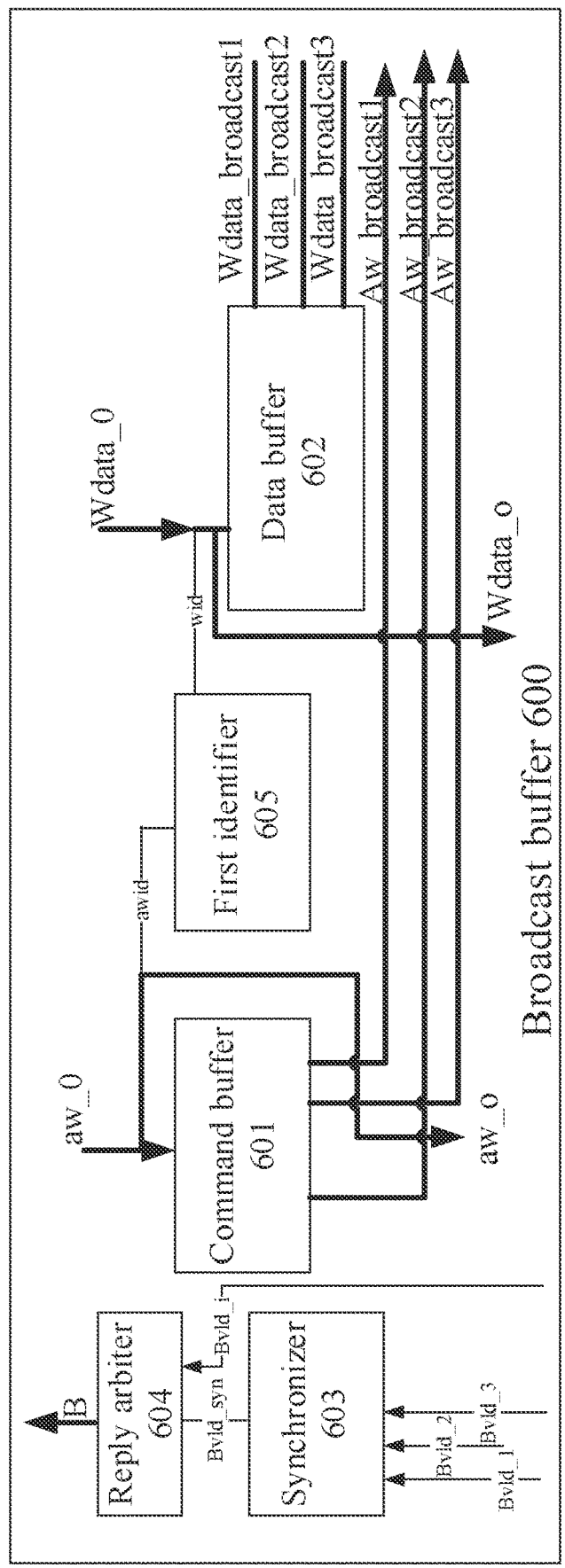
FIG. 3 is a schematic diagram of a broadcast buffer according to an embodiment of the present application.

FIG. 3 is a schematic diagram of a broadcast buffer 600 according to an embodiment of the present application, and the broadcast buffer 600 is an example of the broadcast buffer 501 in FIG. 2. The broadcast buffer 600 includes a command buffer 601 and a data buffer 602. As shown in FIGS. 2 and 3, the broadcast buffer 600 receives the write command aw_0 and the write data Wdata_0 (i.e., input data) generated by the accelerator AI core 0. And in the case that the broadcast function of the broadcast is disabled, the write command aw_0 and the write data Wdata_0 are output to SRAM 0 respectively through the write command channel AW and the write data channel W, thus writing the input data to the SRAM 0; in the case that the broadcast function of the broadcast is enabled (e.g., the broadcast enable signal Broadcast is at a high level), the command buffer 601 receives and caches the write command from the coupled accelerator AI core 0 and broadcasts it out to instruct to write the broadcast weight data into the same offset address of the other first memories; while the data buffer 602 receives and caches the weight data from the AI core 0, and broadcasts it out. The command buffer 601 may broadcast out to each broadcast arbiter, for example, the command buffer 601 broadcasts the write command Aw_broadcast1 to the broadcast arbiter corresponding to the accelerator AI core 1, broadcasts the broadcast write command Aw_broadcast2 to the broadcast arbiter corresponding to the accelerator AI core 2, and so on. The data buffer 602 may also broadcast to each broadcast arbiter, for example, the data buffer 602 broadcasts write data Wdata_broadcast1 to the broadcast arbiter corresponding to the accelerator AI core 1, broadcasts write data Wdata_broadcast2 to the broadcast arbiter corresponding to the accelerator AI core 2, and so on.

In one embodiment, the broadcast buffer 600 further comprises a first identifier 605. The first identifier 605 is configured to obtain identification information from the write command received from the accelerator, determine whether the identification information is target identification information, and notify the data buffer to receive the weight data when it is determined that the identification information is the target identification information. The target identification information may be the ID of the direct memory access DMA in the accelerator AI core 0. As shown in FIG. 3, the first identifier 605 obtains identification information from the received write command aw_0, and determines whether the identification information is the ID of the direct memory access DMA in the corresponding accelerator, and if so, allows the data buffer 602 to receive and cache the write data Wdata_0.

In one embodiment, the broadcast buffer 600 further comprises a synchronizer 603 and a reply arbiter 604. The synchronizer 603 is configured to receive and synchronize write completion response signals from the respective broadcast arbiters and output the synchronized write completion response signals to the reply arbiter 604. Specifically, after each broadcast arbiter writes the broadcast weight data into the corresponding SRAM, it may send the corresponding write completion response signals to the synchronizer 603 of the broadcast buffer. For example, if each broadcast arbiter corresponding to the accelerators AI core 1-AI core 3 writes the broadcast weight data to the corresponding SRAM 1-SRAM 3, the synchronizer 603 may respectively receive the write completion response signals Bvld_1, Bvld_2 and Bvld_3 (as shown in FIG. 3) of each broadcast arbiter and synchronize these write completion response signals Bvld_1, Bvld_2 and Bvld_3 and output a synchronized write completion response signal Bvld_syn. The reply arbiter 604 is configured to receive a write completion response signal from the first memory corresponding to the broadcast buffer and the synchronized write completion response signal from the synchronizer, and arbitrate priorities of these received write completion response signals, and output these write completion response signals according to the arbitration result. As shown in FIG. 3, after completing the operation of SRAM 0 through the broadcast buffer, SRAM 0 may send the write completion signal Bvld_i to the reply arbiter 604. The reply arbiter 604 may also receive the synchronized write completion response signal Bvld_syn output by the synchronizer 603. The reply arbiter 604 may arbitrate the priorities of the received write completion response signal Bvld_i and the synchronized write completion response signal Bvld_syn, and output these write completion response signals to the corresponding accelerator AI core 0 according to the arbitration result.

Figure 4:
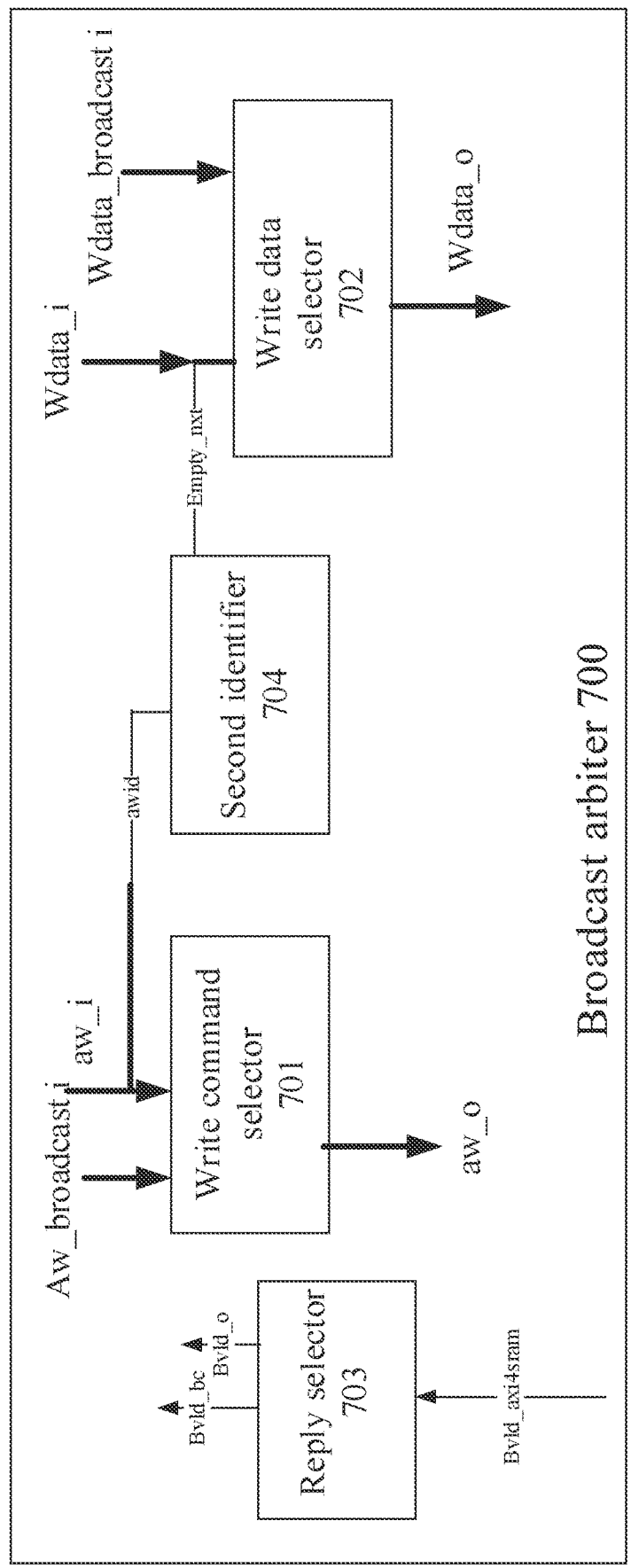
FIG. 4 is a schematic diagram of a broadcast arbiter according to an embodiment of the present application.

FIG. 4 is a schematic diagram of a broadcast arbiter 700 according to an embodiment of the present application, and the broadcast arbiter 700 is an example of the broadcast arbiter 502 in FIG. 2. The broadcast arbiter 700 includes a write command selector 701 and a write data selector 702. The write command selector 701 is configured to output a write command to the corresponding first memory when receiving the write command from the accelerator coupled thereto, and also receive broadcast write commands when the broadcast reception function is enabled. And the write command selector 701 is configured to arbitrate the priorities of the broadcast write command and the write command when simultaneously receiving the broadcast write command and the write command, and output according to the arbitration result. The write data selector 702 is configured to receive the input data from its coupled accelerator, write the input data into the corresponding first memory, and also receive broadcast weight data when the broadcast reception function is enabled. And when simultaneously receiving the broadcast weight data and the input data from the accelerator, the write data selector 702 is configured to arbitrate the priorities of the broadcast weight data and the input data from the accelerator, and output according to the arbitration result. As shown in FIGS. 2 and 4, the direct memory access DMA of any of the accelerators AI core 1-AI core i (i=1, 2, 3) acquires input data from the external second memory DDR, and generates a write command aw_i and a write data Wdata_i (i.e., input data). The write command selector 701 in the broadcast arbiter 700 receives the write command aw_i, and the write data selector 702 receives the write data Wdata_i. If the broadcast reception function of the broadcast arbiter is disenabled, the write command selector 701 and the write data selector 702 can directly output the received write command aw_i and write data Wdata_i to the corresponding SRAM i. If the broadcast reception function of the broadcast arbiter is enabled (e.g. Grp_en is high level), the write command selector 701 may also receive the write command Aw_broadcast i broadcast by the broadcast buffer. And when simultaneously receiving the broadcast write command Aw_broadcast i and the write command aw_i, the write command selector 701 may arbitrate the priorities of the write command aw_i from the accelerator and the broadcast write command Aw_broadcast i, and output these write commands according to the arbitration result. And the write data selector 702 may also receive the write data Wdata_broadcast i broadcast by the broadcast buffer, and when simultaneously receiving the broadcast write data Wdata_broadcast i and the write data Wdata_i from the accelerator, the write data selector 702 may arbitrate the priorities of the write data Wdata_i and the broadcast write data Wdata_broadcast i, and output these write data according to the arbitration result.

In one embodiment, the priority of the broadcast write command Aw_broadcast i and the broadcast write data Wdata_broadcast i can be set higher than the write command aw_i from the accelerator and the write data Wdata_i from the accelerator. That is to say, when the write command selector 701 simultaneously receives the broadcast write command Aw_broadcast i and the write command aw_i from the accelerator, it may preferentially output the broadcast write command Aw_broadcast i to the corresponding first memory, and secondly output the write command aw_i from the accelerator to the corresponding first memory. Similarly, when the write data selector 702 simultaneously receives the broadcast write data Wdata_broadcast i and the write data Wdata_i from the accelerator, it also preferentially outputs the broadcast write data Wdata_broadcast i to the corresponding first memory, secondly output the write data Wdata_i from the accelerator to the corresponding first memory.

If the broadcast arbiter is writing the input data received from the accelerator into the first memory according to the write command from the accelerator when receiving the broadcast write command Aw_broadcast i and the broadcast write data Wdata_broadcast i, it may wait for the write operation to be completed, and then write the broadcast write data Wdata_broadcast i into the first memory according to the broadcast write command Aw_broadcast i.

In one embodiment, the broadcast arbiter 700 further comprises a second identifier 704. The second identifier 704 is configured to obtain identification information from the write command received from the accelerator, determine whether a write operation of the input data corresponding to the write command sent by the accelerator is completed according to the identification information, and notify the write data selector to write the broadcast weight data into the corresponding first memory when it is determined that the write operation of the input data is completed. As shown in FIG. 4, the second identifier 704 obtains the identification information awid from the write command aw_i sent by the accelerator, and determines whether an empty_nxt is generated according to the awid. If the empty_nxt can be generated, it indicates that the write operation on the write data Wdata_i corresponding to the write command aw_i has completed. At this point, the second identifier 704 allows the write data selector 702 to select the broadcast write data Wdata_broadcast i to be written into the corresponding SRAM.

In one embodiment, the broadcast arbiter 700 further comprises a reply selector 703. The reply selector 703 is configured to receive write completion response signals from the corresponding first memory and to selectively send a write completion response signal to its coupled accelerator or the broadcast buffer according to the write completion response signal. As mentioned above, the data written into SRAM i (i=1, 2, 3) may be input data from the coupled accelerator AI core i or the weight data broadcast by the broadcast buffer. Therefore, when SRAM i completes the write operation and sends a corresponding write completion response signal Bvld_axi4sram to the reply selector 703, the reply selector 703 needs to select the reply object according to the data source corresponding to the write completion response signal Bvld_axi4sram. If the write completion response signal Bvld_axi4sram corresponds to the input data sent by the accelerator AI core i, a write completion signal bvld_o is sent to the accelerator AI core i. If the write completion response signal Bvld_axi4sram corresponds to the weight data broadcast by the broadcast buffer, a write completion signal bvld_bc is sent to the broadcast buffer. The reply selector 703 can determine the data source according to the identification information carried in the write completion response signal Bvld_axi4sram. It can be understood that only when the broadcast reception function of the broadcast arbiter is enabled, the reply selector 703 needs to determine the data source corresponding to the write completion response signal Bvld_axi4sram and select the reply object according to the data source. In the case that the broadcast reception function of the broadcast arbiter is disenabled, the reply selector 703 does not need to determine the data source corresponding to the write completion response signal Bvld_axi4sram and the write completion response signal bvld_o can be sent directly to its coupled accelerator when receiving the write completion response signal Bvld_axi4sram.

In embodiments of the present application, each accelerator has its own SRAM, and in the situation that multiple accelerators access data in the same address range in parallel, each accelerator accesses its own SRAM interface in parallel without arbitration, so there is no bandwidth penalty. When the bus bandwidth is large (for example, 1024 bit), it will not cause the problem of back-end timing congestion. There is no limitation to the extension of core number of the accelerators under the condition that the DDR bandwidth, power consumption, and area of chip are satisfied.

Furthermore, the access bandwidth of the accelerators can be improved to reduce access delay, synchronization and waiting time of each accelerator, so as to achieve synchronization running time balance of the multiple accelerators, further to facilitate the performance and power consumption of the entire deep learning system.

In addition, the accelerators have two modes of batch processing and non-batch processing. In the batch processing mode, the input weight data can be reused. Only one hardware accelerator is required to transfer the input weight data from the DDR to its corresponding SRAM, and at the same time, the input weight data is broadcast to SRAM corresponding to other hardware accelerators, thus saving the time overhead and power consumption caused by transferring the data from the DDR to the local SRAMs.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

The specification includes combinations of the various embodiments described herein. Separate references to embodiments (such as "an embodiment" or "some embodiments" or "preferred embodiments") do not necessarily refer to the same embodiment; however, these embodiments are not mutually exclusive unless indicated as mutually exclusive or clearly mutually exclusive by those skilled in the art. It should be noted that unless the context clearly indicates or requires otherwise, the word "or" is used in this specification in a non-exclusive sense.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

What is claimed is:

1. A topology of accelerators, comprising:
a plurality of accelerators, each of the plurality of accelerators corresponding to a first memory and obtaining input data from an external second memory, wherein each accelerator can only directly access its corresponding first memory; and
a broadcast buffer, coupled between one of the plurality of accelerators and its corresponding first memory, and when receiving a write command and the input data from the accelerator to which it is coupled, the broadcast buffer is configured to write the input data into the corresponding first memory according to the write command, and when broadcast is enabled, the broadcast buffer is configured to broadcast the write command and weight data in the input data; and
at least one broadcast arbiter, respectively coupled between each of the other accelerators in the plurality of accelerators and its corresponding first memory, and when receiving the write command and the input data from the accelerator to which it is coupled, the at least one broadcast arbiter is configured to write the input data into the corresponding first memory, and when broadcast reception is enabled, the at least one broadcast arbiter is configured to receive a broadcast write command and the weight data, and when simultaneously receiving the write command and the input data from the accelerator and the broadcast write command and the weight data, the at least one broadcast arbiter is further configured to arbitrate priorities of the write command and the input data from the accelerator and the broadcast write command and the weight data, and perform a write operation according to an arbitration result,
wherein the broadcast buffer is respectively coupled to each of the at least one broadcast arbiter via a broadcast write channel.

2. The topology of the accelerators of claim 1, wherein the priority of the broadcast write command and weight data is higher than the priority of the write command and input data from the accelerator.

3. The topology of the accelerators of claim 1, wherein the broadcast buffer comprises:
a command buffer, configured to receive the write command from the accelerator to which it is coupled when the broadcast is enabled, and to broadcast the write command to indicate to write the broadcast weight data into the same offset address of the other first memories; and
a data buffer, configured to receive the weight data from the accelerator to which it is coupled and to broadcast the weight data when the broadcast is enabled.

4. The topology of the accelerators of claim 3, wherein the broadcast buffer further comprises:
a first identifier, configured to obtain identification information from the write command received from the accelerator, determine whether the identification information is target identification information, and notify the data buffer to receive the weight data when it is determined that the identification information is the target identification information.

5. The topology of the accelerators of claim 3, wherein the broadcast buffer further comprises:
a synchronizer, configured to receive and synchronize a write completion response signal from the broadcast arbiter and output the synchronized write completion response signal; and
a reply arbiter, configured to receive a write completion response signal from the first memory corresponding to the broadcast buffer and the synchronized write completion response signal from the synchronizer, and arbitrate priorities of the received write completion response signals, and output the write completion response signal according to arbitration result.

6. The topology of the accelerators of claim 1, wherein the broadcast arbiter comprises:
a write command selector, configured to receive a write command from the accelerator to which it is coupled, output the write command to the corresponding first memory, and also receive broadcast write commands when broadcast reception is enabled, and arbitrate priorities of the broadcast write command and the write command from the accelerator when simultaneously receiving the write command from the accelerator and the broadcast write command, and output according to arbitration result; and
a write data selector, configured to receive the input data from the accelerator to which it is coupled, write the input data into the corresponding first memory, and also receive the broadcast weight data when the broadcast reception is enabled, and arbitrate priorities of the broadcast weight data and the input data from the accelerator when simultaneously receiving the broadcast weight data and the input data from the accelerator, and output according to arbitration result.

7. The topology of the accelerators of claim 6, wherein the broadcast arbiter further comprises:
a second identifier, configured to obtain identification information from the write command received from the accelerator, determine whether a write operation of the input data corresponding to the write command from the accelerator is completed according to the identification information, and notify the write data selector to write the broadcast weight data into the corresponding first memories when it is determined that the write operation is completed.

8. The topology of the accelerators of claim 6, wherein the broadcast arbiter further comprises:
a reply selector, configured to receive write completion response signals from the corresponding first memories, and selectively send the write completion response signals to the broadcast buffer or the accelerator to which it is coupled according to data source corresponding to the write completion response signal.

9. The topology of the accelerators of claim 1, wherein the accelerator comprises a direct memory accessor;
wherein the direct memory accessor is configured to obtain input data from the external second memory and write the input data into the corresponding first memory through the broadcast buffer.

* * * * *